UNITED STATES PATENT OFFICE.

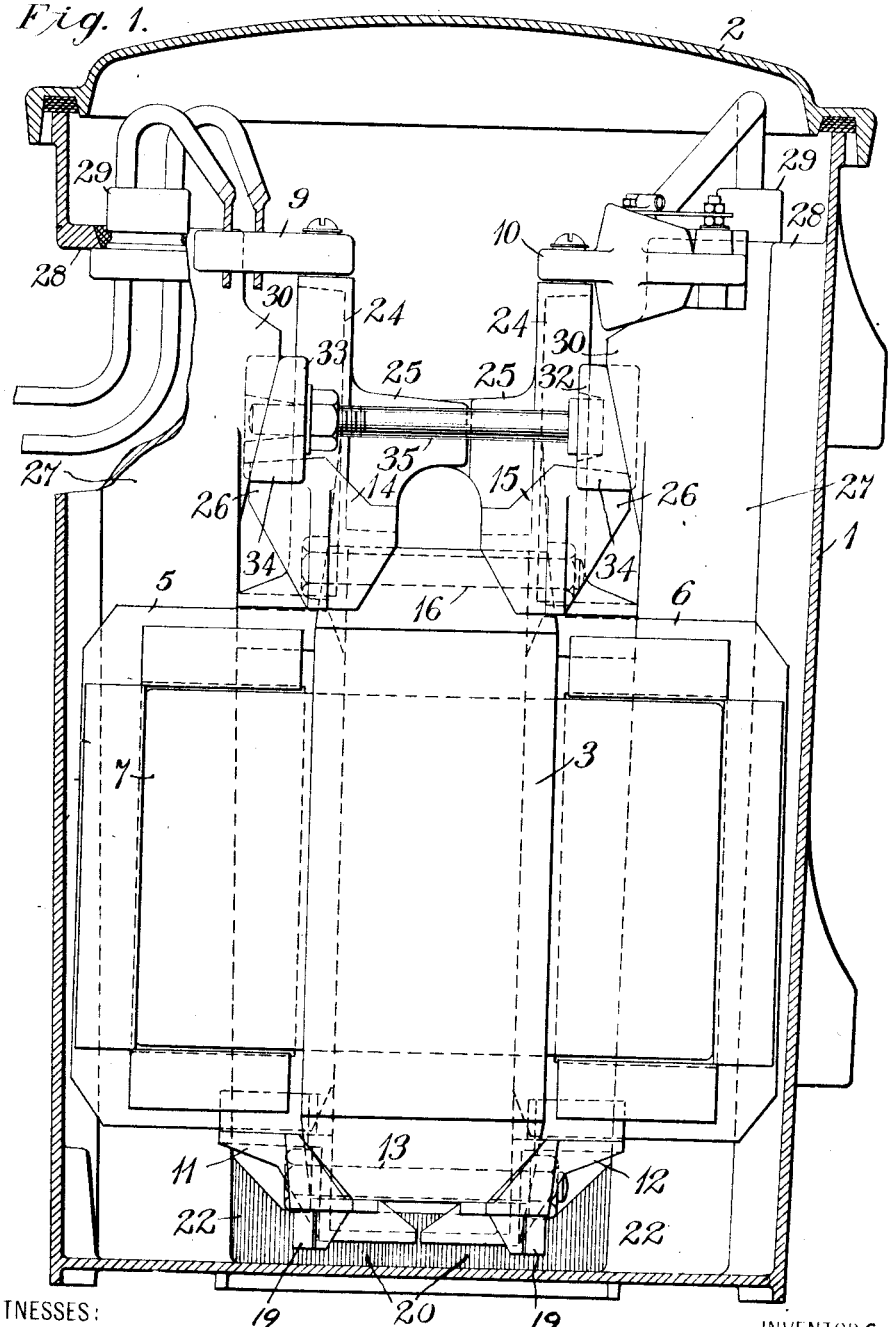

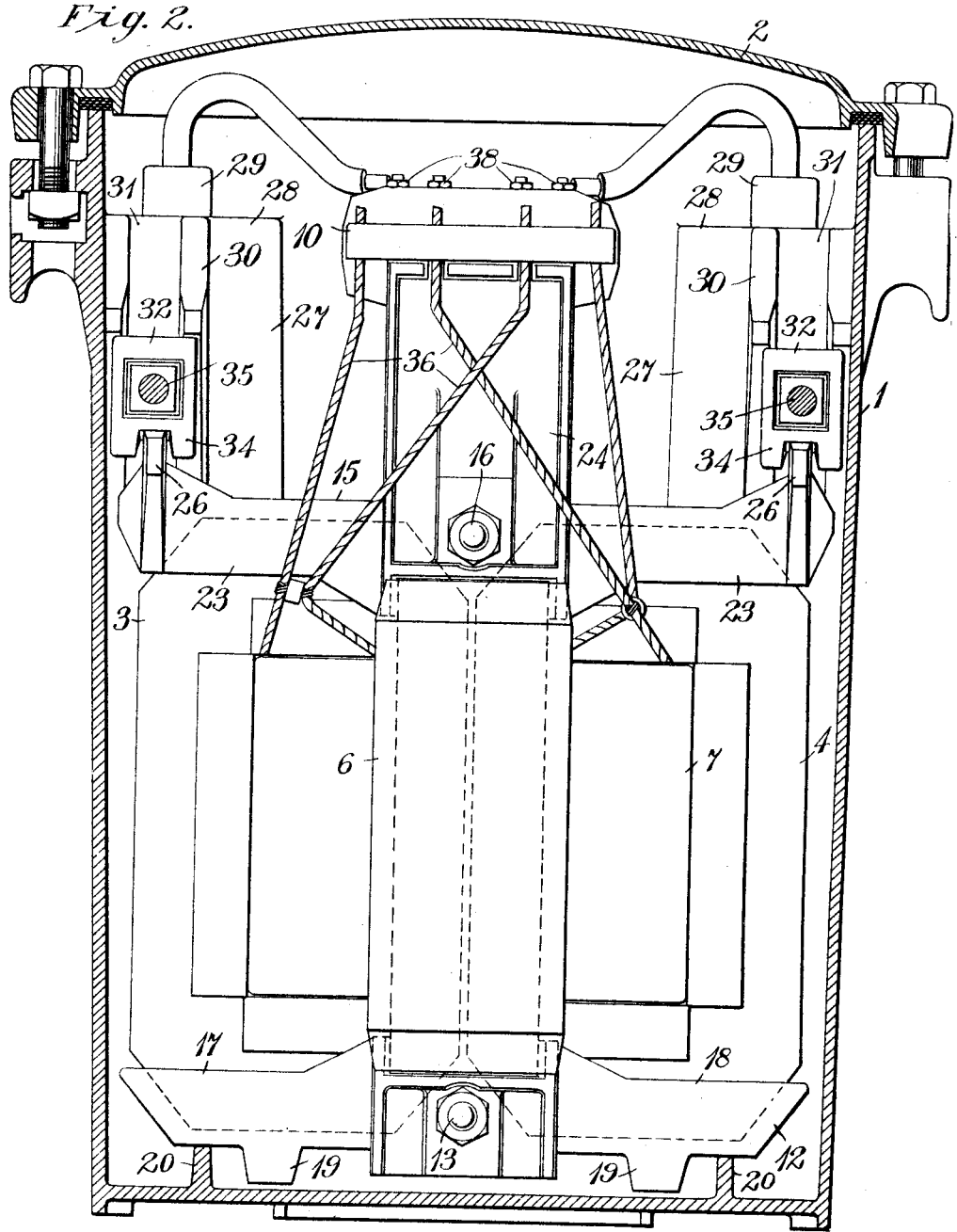

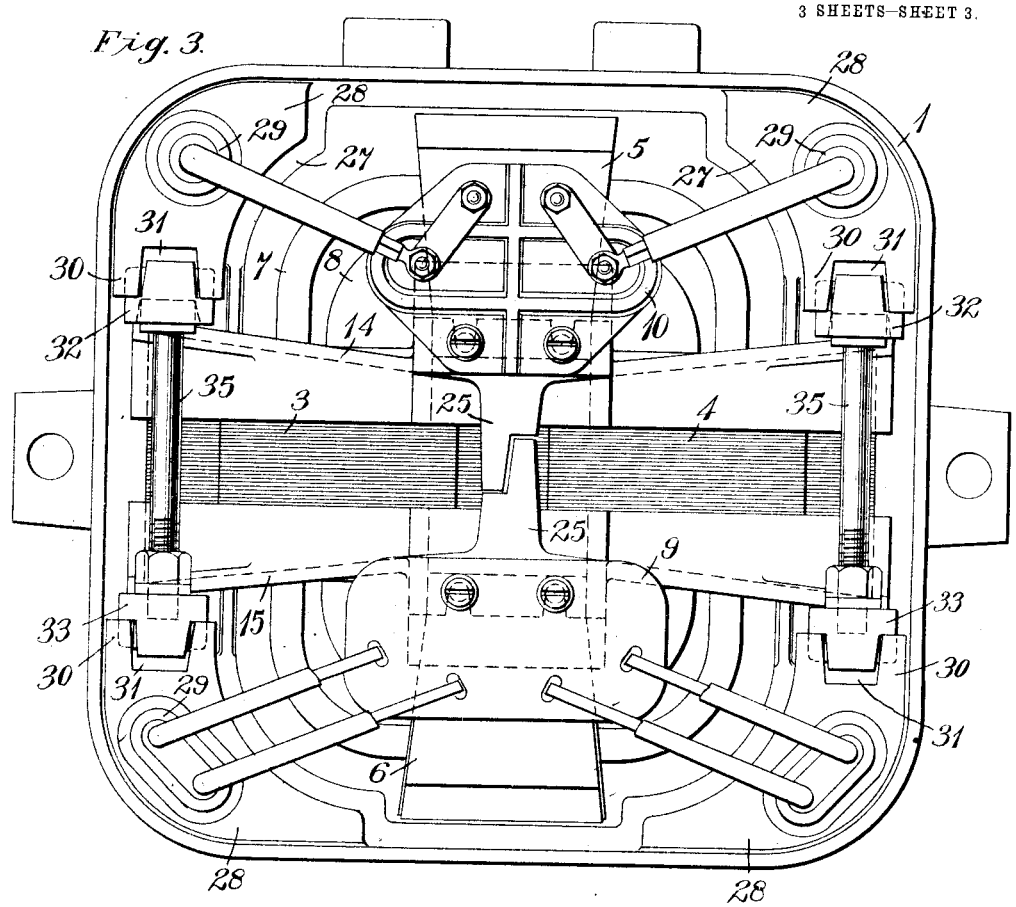

CHRISTIAN AALBORG, OF WILKINSBURG, AND OTTO SCHAUMBERG, OF PITTSBURGH, PENNSYLVANIA, ASSIGNORS, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

TRANSFORMER.

1,035,069.      Specification of Letters Patent.      Patented Aug. 6, 1912.

Application filed July 6, 1908. Serial No. 442,222.

*To all whom it may concern:*

Be it known that we, CHRISTIAN AALBORG and OTTO SCHAUMBERG, citizens of the United States, and residents, respectively, of Wilkinsburg and Pittsburgh, both in the county of Allegheny and State of Pennsylvania, have invented a new and useful Improvement in Transformers, of which the following is a specification.

Our invention relates to alternating current transformers and inclosing casings therefor and it has for its object to provide a simple and efficient means for clamping together the plates or laminæ of which the core structure is composed and other adjustable means coöperating therewith for securing the transformer within the casing.

It has been found desirable to construct transformers with concentric primary and secondary coils which are approximately cylindrical or elliptical in transverse section, opposite sides of said coils being surrounded by magnetizable core members arranged in radial planes. These core members are, of course, built up of plates or laminæ and must be securely clamped together in order that the transformer may be handled without injury to the coils and without warping the core structure or disarranging its elements.

According to our present invention, we provide an inclosing tank or casing which is well adapted to receive transformers of the class above indicated and, furthermore, we provide special end frames and holding-in devices by which the transformer core members may be firmly held together and readily secured to the casing after the transformer is assembled and disposed therein.

Figures 1 and 2 are elevations at right angles to each other, of a transformer and inclosing casing constructed in accordance with our invention, the casing being shown in section to disclose the parts of the transformer and the devices for securing it to the casing. Fig. 3 is a plan view, with the cover removed, of the transformer shown in Figs. 1 and 2 and Figs. 4, 5, 6, 7, 8, and 9 are detail views of the holding-in device.

Referring to the drawings, the device illustrated comprises an inclosing casing consisting of a tank 1 and cover 2, a transformer comprising a plurality of core sections 3, 4, 5, and 6 and coils 7 and 8, terminal blocks 9 and 10 and a holding-in device.

As shown, the core consists of two members disposed in planes at right angles to each other, each comprising two sections which surround opposite sides of the primary and secondary windings 7 and 8 of the transformer.

After the transformer cores and coils are assembled their lower ends are clamped together by a pair of end frames 11 and 12 and a bolt 13 and their upper ends are similarly clamped together by a pair of end frames 14 and 15 and a bolt 16.

In order that the core may occupy a minimum space within the coils, the core sections 3 and 4 are disposed with their adjacent edges close together, while the other sections 5 and 6 are located with their adjacent edges close to the sides of the sections 3 and 4.

In order to improve the ventilation of the core members, the laminæ of which they are composed may be so spaced apart at their outer sides as to place each plate or lamina more nearly in a radial plane as indicated in Fig. 3 of the drawings. The end plates are specially constructed to accommodate them to the core structures when they are spaced as above indicated.

Each of the lower end frames 11 and 12 is provided with flanges 17 and 18 which are so formed as to engage the sides and edges of the lower ends of the core sections. The lower end frames 11 and 12 are also provided with projections 19 which constitute feet by means of which the transformer may be supported when it is removed from the casing. When in the casing a free circulation of oil or other insulating fluid is permitted since the transformer is supported on ribs 20 which project upwardly from the bottom of the tank to receive the end frames 11 and 12 and are provided with inclined edge surfaces 22 adjacent to their ends to assist in guiding the transformer to its proper central location when lowered into the tank.

Each of the upper end frames is provided with flanges 23 which engage the outer faces of the core members and with upwardly extending projections 24 to the top of which terminal blocks are secured. The projections 24 are provided with inwardly extending tongues 25 which are notched and overlap each other to form a joint. The ends of each upper frame are provided with outwardly extending lateral projections 26 the upper edges of which are slightly beveled.

The corners of the approximately rectangular tank 1 are provided with external longitudinal depressions 27, the upper ends of which form ledges 28 to receive and support insulating bushings 29. The inner faces of the depressions 27 at two opposite sides of the tank are provided with ribs 30 that form grooves 31 the beveled sides of which engage the surfaces of two pairs of adjusting blocks 32 and 33. The lower ends of the blocks 32 and 33 are provided with bifurcated projections 34 which straddle the lateral projections 26 on the upper end frames. The arrangement of parts is such that, when the blocks 32 and 33 are placed in position, after the transformer is assembled in the tank, and are forced apart by expansion bolts 35 which complete the holding-in device, the ends of the upper frame are so forced downwardly and inwardly that it is impossible to effect any relative movement between the transformer and the casing without loosening the bolts. The coils 7 and 8 are provided with conducting leads 36 certain of which terminate in terminal members 38 that are secured to the terminal block 10, others being threaded through holes in the insulating terminal blocks 9. Conducting leads extend through the bushings 29 and form connections between the terminal members and external circuits. The tongue projections 25 on the upper end frames together constitute a loop which may be engaged by a crane hook in lifting the transformer from the casing.

The insulating bushings 29 are preferably sealed to the casing, and leads are sealed in the bushings so that, when the cover is securely fastened to the tank by bolts, the transformer is weather proof and may be operated outdoors.

Inasmuch as various structural modifications may be effected in the device illustrated without departing from the spirit of our invention, we desire that only such limitations shall be imposed as are indicated in the appended claims.

We claim as our invention:

1. The combination with an inclosing casing, a winding and a plurality of core sections surrounding the sides of the winding, of top and bottom clamping frames for the core sections and a holding-in means comprising clamping blocks that engage both the casing and the top clamping frames and bolts for forcing said blocks into clamping relation with the casing and the top frames.

2. The combination with an inclosing casing, an approximately cylindrical winding and a plurality of core sections surrounding the sides of the winding and disposed in substantially radial planes, of top and bottom frames for clamping the core sections together and an adjustable holding-in means comprising bolts and blocks actuated by said bolts into clamping engagement with the casing and the top frames.

3. The combination with an inclosing casing, an approximately cylindrical winding and a plurality of core sections surrounding the sides of the winding and disposed in substantially radial planes, of end frames for binding the core sections together, adjustable blocks in engagement with the end plates and the casing, and bolts for forcing said blocks outwardly against the casing and downwardly against the end frames.

4. The combination with an inclosing casing and a transformer comprising substantially concentric and approximately cylindrical primary and secondary coils, and a plurality of laminated core sections surrounding the sides of the coils and disposed in substantially radial planes, of end frames for binding the laminæ of the core sections together and maintaining the relative positions of the several sections, adjustable blocks coöperating directly with the end frames and with the casing, and means for forcing said blocks into clamping relation.

5. The combination with an inclosing casing having downwardly beveled corner projections, a transformer comprising an approximately cylindrical winding, a plurality of core sections surrounding the sides of the winding and disposed in substantially radial planes, and flanged end frames for clamping the core sections together, of a holding-in device for securing the transformer in the casing, said device comprising wedge blocks which engage the casing projections and projections on the end frames, and expansion bolts interposed between opposite pairs of the wedge blocks.

6. The combination with an inclosing casing having downwardly beveled corner projections, a transformer comprising substantially concentric and approximately cylindrical primary and secondary coils, a plurality of laminated core sections surrounding the sides of the coils and disposed in substantially radial planes, and end frames for binding the laminæ of the core sections together and maintaining the relative positions of the several sections, said end frames being provided with lateral projections, of a holding-in device for securing the transformer in the casing, said device comprising wedge blocks which engage the projections on the end frames and the projections on the interior of the casing, and expansion bolts interposed between opposite pairs of wedge blocks.

In testimony whereof, we have hereunto subscribed our names this 27th day of June, 1908.

CHRISTIAN AALBORG.
OTTO SCHAUMBERG.

Witnesses:
OTTO P. SCHUSTER,
J. W. BROWN.